(12) United States Patent
Cockeram

(10) Patent No.: US 10,406,774 B2
(45) Date of Patent: Sep. 10, 2019

(54) DIFFUSION BONDING OF SILICON CARBIDE USING IRIDIUM AND HERMETIC SILICON CARBIDE-IRIDIUM BONDS

(71) Applicant: United States Department of Energy, Washington, DC (US)

(72) Inventor: Brian V. Cockeram, West Mifflin, PA (US)

(73) Assignee: U.S. Department of Energy, Washington, DC (US)

(*) Notice: Subject to any disclaimer, the term of this patent is extended or adjusted under 35 U.S.C. 154(b) by 324 days.

(21) Appl. No.: 15/417,293

(22) Filed: Jan. 27, 2017

(65) Prior Publication Data

US 2018/0264770 A1  Sep. 20, 2018

Related U.S. Application Data

(60) Provisional application No. 62/408,922, filed on Oct. 17, 2016.

(51) Int. Cl.
*B23K 31/02* (2006.01)
*B32B 1/08* (2006.01)
(Continued)

(52) U.S. Cl.
CPC .............. *B32B 1/08* (2013.01); *B23K 1/0008* (2013.01); *B32B 15/04* (2013.01); *B32B 37/10* (2013.01);
(Continued)

(58) Field of Classification Search
CPC ........... B32B 1/08; B32B 37/10; B32B 15/04; B32B 2309/12; B32B 2309/68;
(Continued)

(56) References Cited

U.S. PATENT DOCUMENTS 2,857,663 A    10/1958  Beggs
3,031,331 A *   4/1962  Aves, Jr. ............... C23C 4/02
                                                  428/216
(Continued)

FOREIGN PATENT DOCUMENTS

EP    0564245         3/1993
EP    0564245 B1  *  6/1997  ............. B32B 18/00
(Continued)

OTHER PUBLICATIONS

Chen et al., "Mechanisms of High-Temperature Fatigue in Silicon Carbide Ceramics," pp. 1-8, Fatigue and Fracture Behaviours of high Temperature Materials (Peter K. Liaw, ed.) The Minerals, Metals & Materials Society (TMS) (2000).
(Continued)

*Primary Examiner* — Kiley S Stoner
(74) *Attorney, Agent, or Firm* — Robert T. Burns; Jennifer R. Mahalingappa; Brian J. Lally

(57) ABSTRACT

An exemplary method of bonding of silicon carbide and objects having a hermetic silicon carbide-iridium-silicon carbide bond. The method includes the steps of inserting an iridium foil between two SiC layers; heating the iridium foil and SiC layers at a temperature of 1500 C in a vacuum of <10−5 ton; applying a pressure between 1 ksi and 7 ksi to the iridium foil and SiC layers; maintaining the temperature and pressure for 6-10 hours; and forming a hermetic seal having a leak rate <3×10−9 cm3/sec between the iridium foil and the two SiC layers. The SiC-iridium bonds lack cracks and are hermetic.

13 Claims, 6 Drawing Sheets

(51) Int. Cl.
*B32B 37/10* (2006.01)
*B32B 15/04* (2006.01)
*B23K 1/00* (2006.01)
*B23K 103/00* (2006.01)
*B23K 101/04* (2006.01)

(52) U.S. Cl.
CPC ...... *B23K 2101/04* (2018.08); *B23K 2103/52* (2018.08); *B32B 2309/02* (2013.01); *B32B 2309/04* (2013.01); *B32B 2309/105* (2013.01); *B32B 2309/12* (2013.01); *B32B 2309/68* (2013.01)

(58) Field of Classification Search
CPC ............ B32B 2309/02; B32B 2309/04; B32B 2309/105; B23K 1/00–206; B23K 35/0233–0238; B23K 2103/52–54; B23K 20/00; B23K 20/02; B23K 20/04; B23K 2101/04–06
USPC .... 228/121–124.7, 245–262, 56.3, 218, 221, 228/193–195
See application file for complete search history.

(56) References Cited

U.S. PATENT DOCUMENTS

| | | | |
|---|---|---|---|
| 3,116,168 A * | 12/1963 | Gee | G01K 7/06 136/228 |
| 3,594,895 A | 7/1971 | Hill | |
| 3,621,111 A * | 11/1971 | Danko | H01K 1/40 174/50.64 |
| 4,624,403 A | 11/1986 | Kohon et al. | |
| 5,125,557 A | 6/1992 | Tanaka et al. | |
| 5,133,855 A | 7/1992 | Taylor | |
| 5,211,776 A * | 5/1993 | Weiman | C23C 4/00 148/525 |
| 5,294,489 A * | 3/1994 | Luthra | B32B 18/00 428/366 |
| 5,503,703 A | 4/1996 | Dahotre et al. | |
| 5,552,352 A * | 9/1996 | Brun | C04B 35/573 428/368 |
| 5,599,468 A | 2/1997 | Mako et al. | |
| 6,336,269 B1 | 1/2002 | Eldridge et al. | |
| 6,586,704 B1 | 7/2003 | Cockeram | |
| 6,599,643 B2 | 7/2003 | Heimann | |
| 6,765,144 B1 | 7/2004 | Wang et al. | |
| 6,778,406 B2 | 8/2004 | Eldridge et al. | |
| 6,853,067 B1 | 2/2005 | Cohn et al. | |
| 6,935,549 B2 | 8/2005 | Wolf et al. | |
| 7,079,900 B2 | 7/2006 | Greenberg et al. | |
| 7,257,446 B2 | 8/2007 | Greenberg et al. | |
| 7,413,846 B2 | 8/2008 | Maloney et al. | |
| 7,569,452 B2 | 8/2009 | Fu et al. | |
| 7,676,274 B2 | 3/2010 | Hung et al. | |
| 10,256,202 B1 * | 4/2019 | Spry | H01L 24/05 |
| 2002/0038134 A1 * | 3/2002 | Greenberg | A61N 1/0543 607/1 |
| 2003/0021901 A1 * | 1/2003 | Gasse | C04B 41/5071 427/376.2 |
| 2003/0195601 A1 | 10/2003 | Hung et al. | |
| 2004/0108217 A1 | 6/2004 | Dubin | |
| 2004/0130026 A1 * | 7/2004 | Imai | H01L 27/11502 257/751 |
| 2006/0105275 A1 * | 5/2006 | Maloney | A61K 9/0024 430/320 |
| 2007/0053137 A1 * | 3/2007 | Fu | H01G 4/232 361/302 |
| 2007/0084398 A1 * | 4/2007 | Schreck | C30B 25/105 117/68 |
| 2011/0221084 A1 * | 9/2011 | Goodman | C04B 35/571 264/29.5 |
| 2015/0165536 A1 * | 6/2015 | Chaumat | B23K 35/0244 428/408 |

FOREIGN PATENT DOCUMENTS

| | | | |
|---|---|---|---|
| EP | 1263695 | 3/2001 | |
| GB | 2272105 A | 10/1989 | |
| GB | 2272705 A * | 5/1994 | .......... C04B 41/009 |
| WO | WO0168560 | 3/2001 | |
| WO | WO-0168560 A1 * | 9/2001 | .......... C04B 41/009 |

OTHER PUBLICATIONS

Massalski et al., Binary Alloy Phase Diagrams, from 2nd Edition, ASMI-1, Materials Park, OH (1990).

Korst et al., "The Crystal Structures of the Monosilicides of Osmium, Iridium and Ruthenium", J. Phys Chem. vol. 61 (1975) pp. 1541-1543.

Reinacher ET et al., Abstract: "Metallographic Preparation of Noble Metal Samples by Electrolytic Lapping," Platinum Metals Rev. (1975), pp. 140.

Bhan et al., Abstract, vol. 51 (1960) pp. 327-339.

Finnie "Structures and Compositions of the Silicides of Rutherium, Osmium, Rhodium and Iridium," J. Less-Common Metals, vol. 4 (1962) pp. 24-34.

Engstrom et al., "X-Ray Studies of Silicon-Rich Iridium Silicides," Acta Chem. Scand., vol. 24, (1970), pp. 2109-2116.

Engstrom et al., Polymorphism in IrSi3, Acta Chem. Scand., vol. 36, (1982), p. 857-858.

Petersson et al., "Initial Studies on the Possibility to Use Chemical Sensors to Monitor and Control Boilers," Sensors and Actuators B, vol. 111-112 (2005) p. 487-493.

Cogan et al., "Plasma-Enhanced Chemical Vapor Deposited Silicon Carbide as an Implantable Dielectric Coating", J. Biomedical Materials Research, vol. 67A (2003) p. 856-867.

Wingbrant et al., Abstract: "MiSiCFET Chemical Sensors for Applications in Exhaust Gases and Flue Gases", Mat. Sci. Forum, vol. 433-436 (2002) p. 953-956.

Sheehan, "Oxidation-Resistant Carbon-Carbon Composites," AMS International, Engineered Materials Handbook vol. 1: Composites (1987) p. 920-921.

Snell et al., "A Novel Laser Technique for Oxidation-Resistant Coating of Carbon-Carbon Composite," Carbon, vol. 39 (2001) p. 991-999.

Schuster, "Design Criteria & Limitations for SiC-Metal & Si3N4-Metal Joints Derived fr. Phase Diagram Studies of Sys. Si—C-Metal & Si—N-Metal," Ceram. Trans., v.35,1993, p. 43-57.

Searcy et al., "Stability of Solid Phases in the Ternary Systems of Silicon and Carbon w/ Rhenium and the Six Platinum Metals," J. Am. Ceramic Soc., vol. 45 (1962) p. 268-273.

Glass et al., Effectiveness of Diffusion Barrier Coatings for Mo—Re Embedded in C/SiC and C/C, NASA/TM-2001-211264 (Dec. 2001).

* cited by examiner

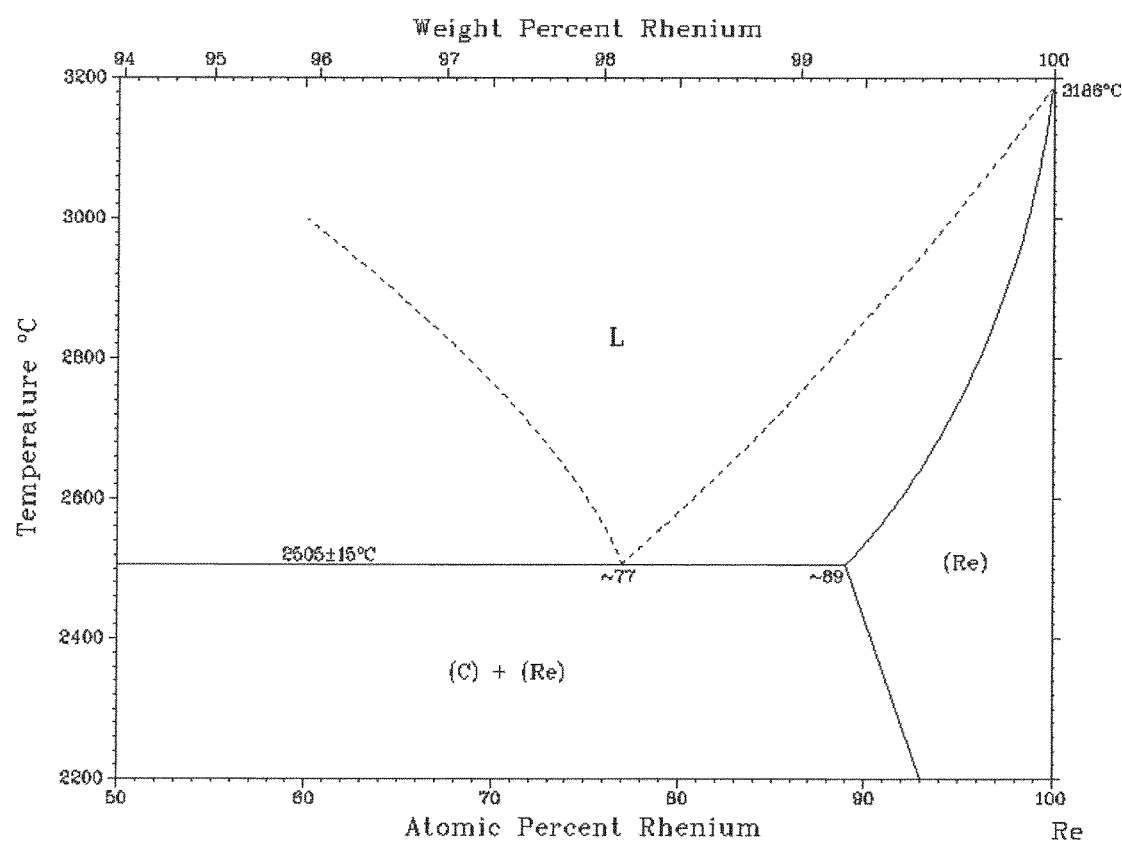
Figure 1. Re-C phase diagram

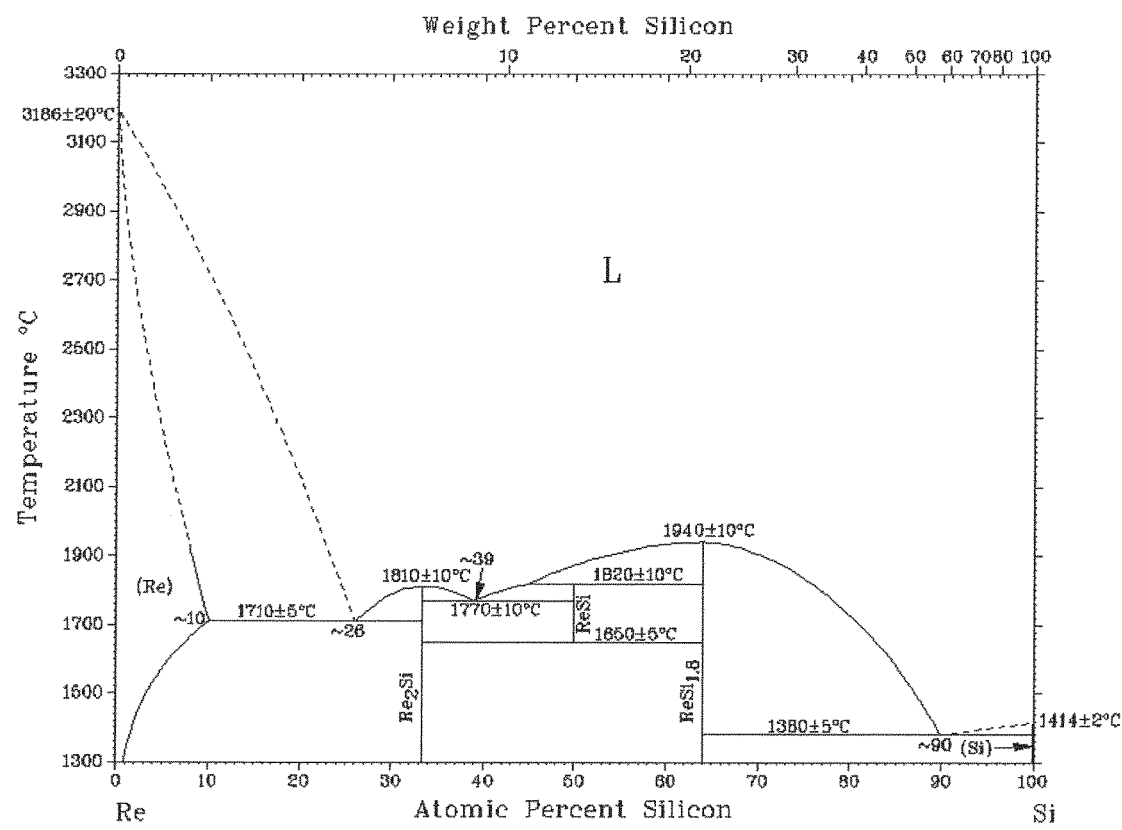
Figure 2. Re-Si phase diagram

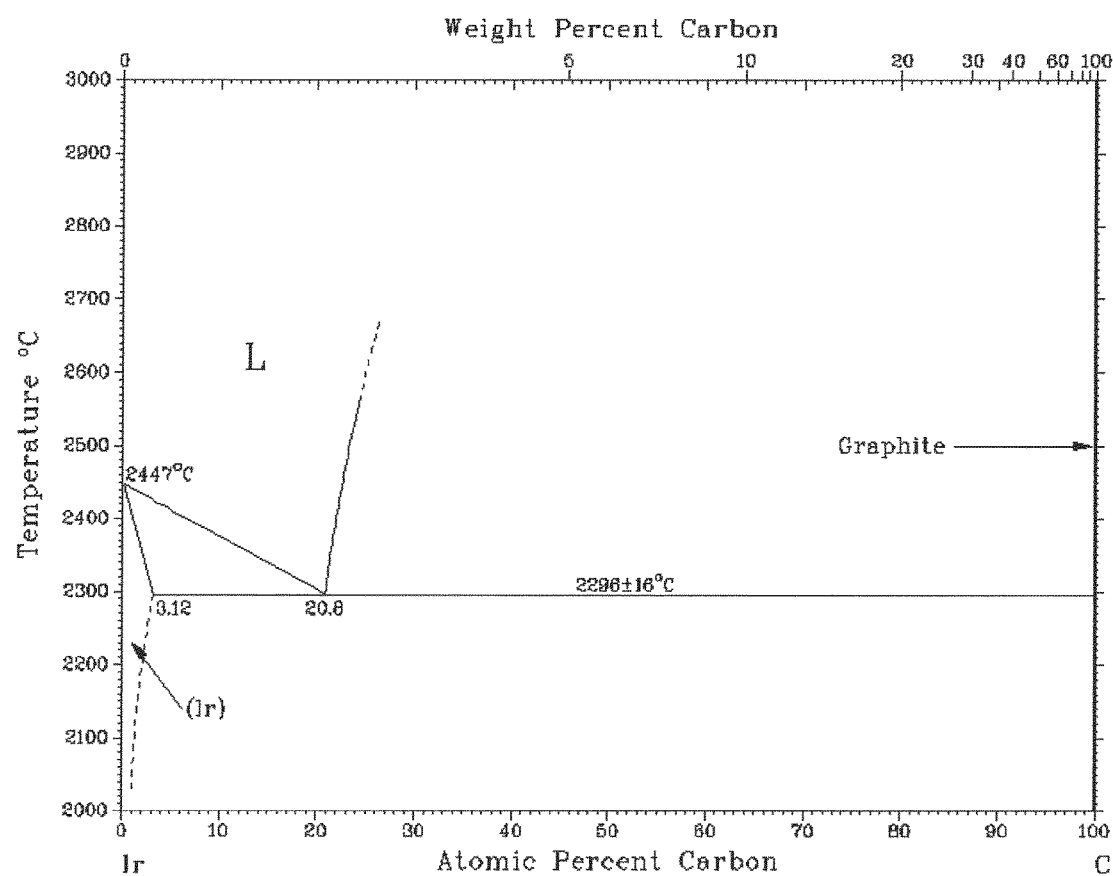
Figure 3. Ir-C phase diagram

DIFFUSION BONDING OF SILICON CARBIDE USING IRIDIUM AND HERMETIC SILICON CARBIDE-IRIDIUM BONDS

CROSS-REFERENCE TO RELATED APPLICATION

This application claims priority under 35 U.S.C. § 119(e) to U.S. Provisional Patent Application No. 62/408,922, entitled "Diffusion Bonding of Silicon Carbide to Form a Hermetic Seal Using Iridium", and filed on 17 Oct. 2016, which application is hereby incorporated by reference.

GOVERNMENT INTEREST STATEMENT

This invention was made with government support under DOE Contract No. DE-AC11-98PN38206 and Navy Contract No. N00024-98-C-4064. The government has certain rights in the invention.

FIELD

The present subject matter relates generally to bonding SiC using iridium.

BACKGROUND

SiC has been investigated for use at high temperatures, for example, between 500° C. and 1500° C., but achieving such use has been problematic, as methods for forming SiC/SiC joints were susceptible to cracking at these high temperatures. Diffusion bonding is one method used for joining SiC to SiC, and such bonding has been achieved using refractory metals foils such as niobium, titanium, molybdenum, nickel, and tungsten, by the formation of carbide and silicide compounds that produce strong bonding and can survive exposures to high temperature. The problem associated with forming a diffusion bond with SiC using metals such as niobium, titanium, molybdenum, nickel, and tungsten is that these metals are converted into carbide and silicide phases in the joint, which are brittle and susceptible to cracking. The formation of cracks means that a hermetic seal cannot be formed using these processes, and the formation of cracks can reduce the strength of the joints. Additionally, the silicide and carbide phases formed in the joint also typically have different physical properties (coefficient of thermal expansion (CTE), elastic modulus, thermal conductivity, etc.) than the SiC base materials, which can produce stresses during thermal cycling that can lead to cracking in the bond region or the SiC adjacent to the joint.

Other attempts to form a SiC bond with a hermetic seal included a brazing composition of approximately 40 to 97% silicon with the rest selected from the group consisting of chromium, rhenium, vanadium, ruthenium, iridium, rhodium, palladium, cobalt, platinum, cerium, and zirconium with some SiC and/or carbon mixed into the material used to form the bond. Other methods differ because they rely upon the formation of molten silicon with various reinforcement phases (one of which may contain iridium) that are formed in the joint. Still other methods were tried, such as polymer infiltration and reaction forming. These other methods are more complicated than diffusion bonding, require 8 to 14 days of processing time, typically contained free silicon that may be detrimental during irradiation, and are generally non-hermetic. Thus, a need exists for a method of diffusion bonding SiC to form a hermetic seal.

SUMMARY

Disclosed is an exemplary method of bonding silicon carbide, including the steps of inserting an iridium foil between two SiC layers; heating the iridium foil and SiC layers at a temperature of 1500° C. in a vacuum of <10-5 torr; applying a pressure between 1 ksi and 7 ksi to the iridium foil and SiC layers; maintaining the temperature and pressure for 6-10 hours; and forming a hermetic seal having a leak rate <3×10-9 cm3/sec between the iridium foil and the two SiC layers. Other exemplary methods include the steps of the step of forming a joint between the iridium foil and at least one of the SiC layers, wherein approximately ⅓ of the joint is iridium and approximately ⅔ of the joint is a reaction zone at a SiC/iridium interface. In certain exemplary methods, the reaction zone includes iridium-silicides.

Also disclosed is an aspect of a hermetic bond. The hermetic bond includes a first layer of silicon carbide, a second layer of silicon carbide, and a bonding layer positioned between the first layer and the second layer. The bonding layer includes an iridium layer, a first reaction zone positioned between the iridium foil layer and the first layer, and a second reaction zone positioned between the iridium foil layer and the second layer. The first reaction zone and the second reaction zone include iridium silicides.

BRIEF DESCRIPTION OF THE DRAWINGS

A description of the present subject matter including various embodiments thereof is presented with reference to the accompanying drawings, the description not meaning to be considered limiting in any matter, wherein:

FIG. 1 illustrates an exemplary Re—C phase diagram;
FIG. 2 illustrates an exemplary Re—Si phase diagram;
FIG. 3 illustrates an exemplary Ir—C phase diagram.

DETAILED DESCRIPTION

Figures 4A, 4B:
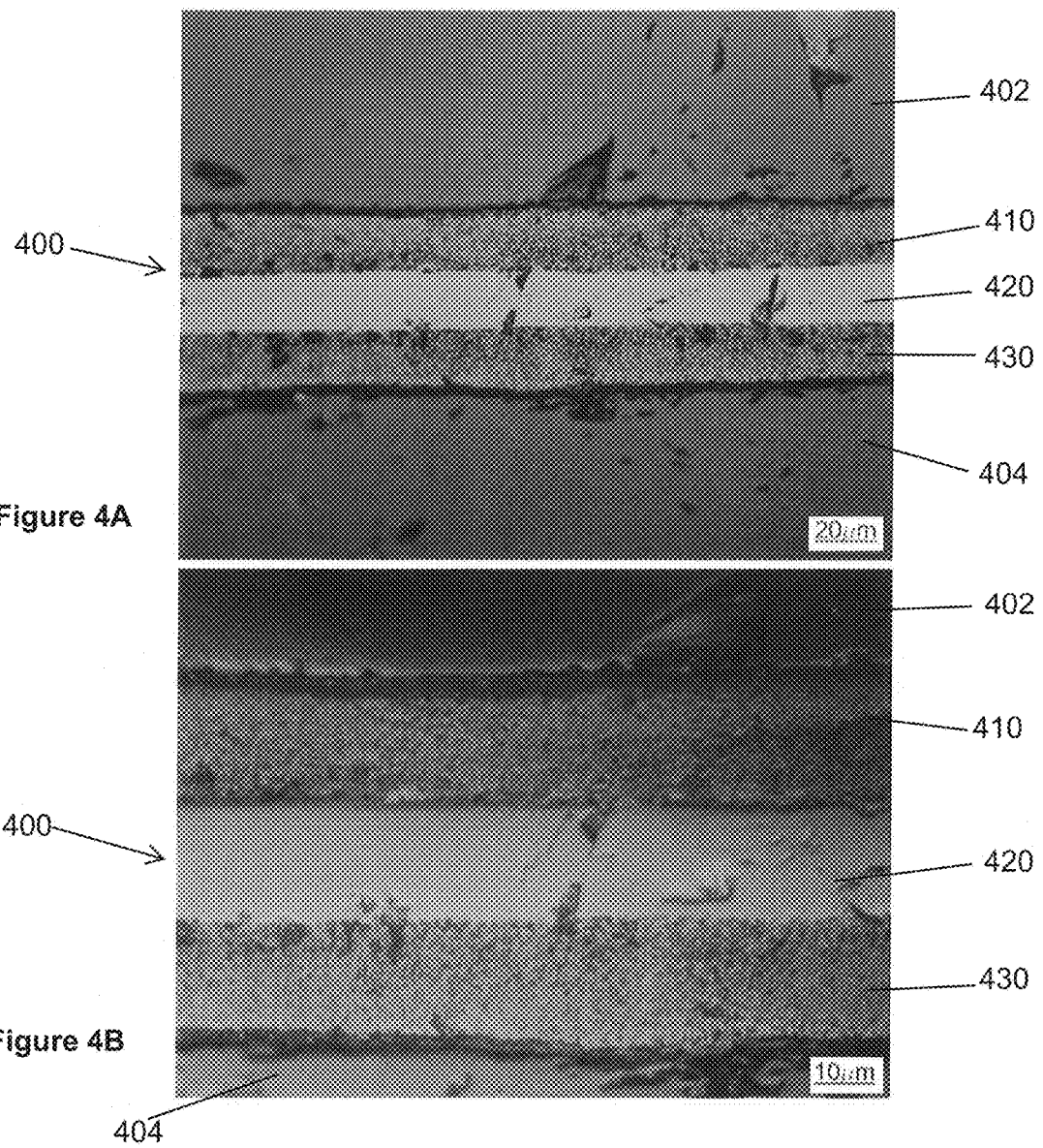
FIGS. 4A-4D illustrate an optical metallography of an exemplary SiC/Ir/SiC bond region.

Throughout the discussion below, use of the terms "about" and "approximately" are used to indicate engineering tolerances which would be well understood by a person of ordinary skill in the art for any particular application or embodiment.

Under certain conditions, diffusion bonding with rhenium foil has been used to produce SiC/rhenium/SiC joints that are hermetic and resistant to thermal cycling and long-thermal thermal exposures at high temperature. It was also found that a hermetic seal can be formed by diffusion bonding SiC with rhenium, as rhenium does not form a stable carbide, rhenium has a relatively high solubility for carbon at high temperature, and only silicide phases are formed. FIGS. 1 and 2 illustrate exemplary Re—C and Re—Si phase diagrams. As discussed below, however, even this technique is problematic, as growth of a Re-silicide layer during long-term annealing to a thickness of above 15 μm at 1100° C. resulted in a loss of hermeticity for SiC/Re joints.

The joint region of a SiC/rhenium/SiC bond made in accordance with the diagrams of FIGS. 1 and 2 includes a thin layer of silicide phase (Re$_5$Si$_3$) at the rhenium/SiC interface that is only 2-4 μm thick, and the bond consists mostly of rhenium (approximately 92% of the thickness) in the central region of the joint while carbon appears to dissolve into the rhenium metal. The dissolution of carbon into the rhenium means that both carbon and silicon diffuse through the silicide layer (Re$_5$Si$_3$) in order for the growth of the silicide layer to occur by the reaction of Equation (1):

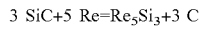

3 SiC+5 Re=Re$_5$Si$_3$+3 C

Since a carbide phase does not form in the Re—C system and since both carbon and silicon must diffuse through the silicide layer for the growth of the silicide layer to occur by Eq. (1), the growth rate for the silicide layer is extremely slow. The high fraction of rhenium in the joint makes the formation a hermetic seal possible for the SiC/SiC joints produced by rhenium diffusion bonding. The slow growth rate of the Re-silicide layer enables the hermetic seal to be obtained during long exposures at high temperatures. Measurements of growth kinetics predicted that SiC/Re joints would maintain hermeticity for 21,000 to 26,000 hours at 1100° C. and more than 270,000 hours at 1000° C. Annealing SiC/Re joints at 1100° C. for up to 8500 hours resulted in no loss of hermeticity. Even SiC/Re has its drawbacks, as during long-term annealing, the Re-silicide layer grew to a thickness of about 15 μm, which resulted in a loss of hermeticity for SiC/Re joints. Many high temperature, high pressure applications may require hermetic joints, such as where gases are heated to high temperatures and/or high pressure and where seeping of the gases through a joint is undesirable.

Forming a SiC bond using iridium solved many problems of previous bonding mechanisms. FIG. 3 illustrates an exemplary Ir—C phase diagram. Unlike the rhenium-diffusion bonding process, where the hermeticity was lost after the silicide reaction zone grew to about 30% of the joint, using iridium resulted in the formation of a hermetic seal with up to ⅔ or more of the joint in the reaction zone. The iridium diffusion bonding method described here is more resistant to thermal exposures and the resulting interdiffusion in the joint that results from such exposures. Iridium has a larger thermal neutron cross-section than rhenium (about a factor of 2 difference) and is only somewhat larger than natural molybdenum.

In certain exemplary embodiments, a silicon carbide (SiC) ceramic joint has been achieved using a 2 mil thick iridium foil to form a SiC/iridium-foil/SiC bond by heating at 1500° C. in vacuum (pressure <10$^{-5}$ torr) for 6 to 10 hours with an applied pressure of 1 ksi to 7 ksi. Achieving such a seal with such a small quantity of iridium in the bond region (0.002" thickness) is desirable in certain applications, as this amount of iridium would be to result in negligible neutron absorption. Limited conversion of the iridium foil at the SiC interface to form an intermetallic compound that is likely an iridium-silicide phase results in a strong bond for SiC. Other materials were considered, but bonding studies were performed with iridium, rhodium, and palladium, and the most desirable bond region was obtained with iridium. In certain exemplary embodiments, iridium with no other additions is used to bond SiC and produce a hermetic seal. In certain exemplary embodiments, the joint that is hermetic and can be exposed to higher temperatures, such as temperatures greater than 1500° C. and less than 2000° C. (approaching the melting point of iridium.)

Iridium is of particular interest for high temperature, high pressure applications because it has a much higher melting temperature (2454° C.) than the other platinum metals, and has a relatively high solubility for carbon (as shown in FIG. 3, for example). A phase diagram for Ir—Si is not known, but iridium-silicide compounds are known to exist. The structure of the SiC/iridium/SiC joint is different than other SiC/metal/SiC diffusion joints because the limited reaction at the SiC/iridium interfaces produces a joint that is about ⅓ iridium, with no observable cracking of the reaction layer or iridium metal. The high fraction of compliant iridium metal results in the formation of a SiC/iridium/SiC joint that is more resistant to cracking, more durable, and more damage resistant.

One literature paper (J. C. Schuster, Ceram. Trans., vol. 35 (1993), pp. 43-57) discusses the available ternary phase diagram for Si—C—Ir, and based on a preliminary amount of data from an article by A. W. Searcy and L. N. Finnie in the Journal of American Ceramic Society (vol. 45 (1962), pp. 268-73), predicts that interactions between SiC and Ir would result in the formation of four different silicide phases in the joint region. The ternary phase diagram isotherm in the article is hypothetical, is not based on data, and not enough results are available to predict even a binary Ir—Si phase diagram. No bonding experiments or a suggestion of bonding conditions are made. Thus, no information is available in the literature on the bonding of SiC using only iridium metal, or the use of iridium metal to bond SiC and produce a seal that is hermetic. As noted above, various high temperature, high pressure applications involving the heating and containment of gases benefit from a seal that retains hermeticity at high temperatures and high pressures.

Figures 4C, 4D:
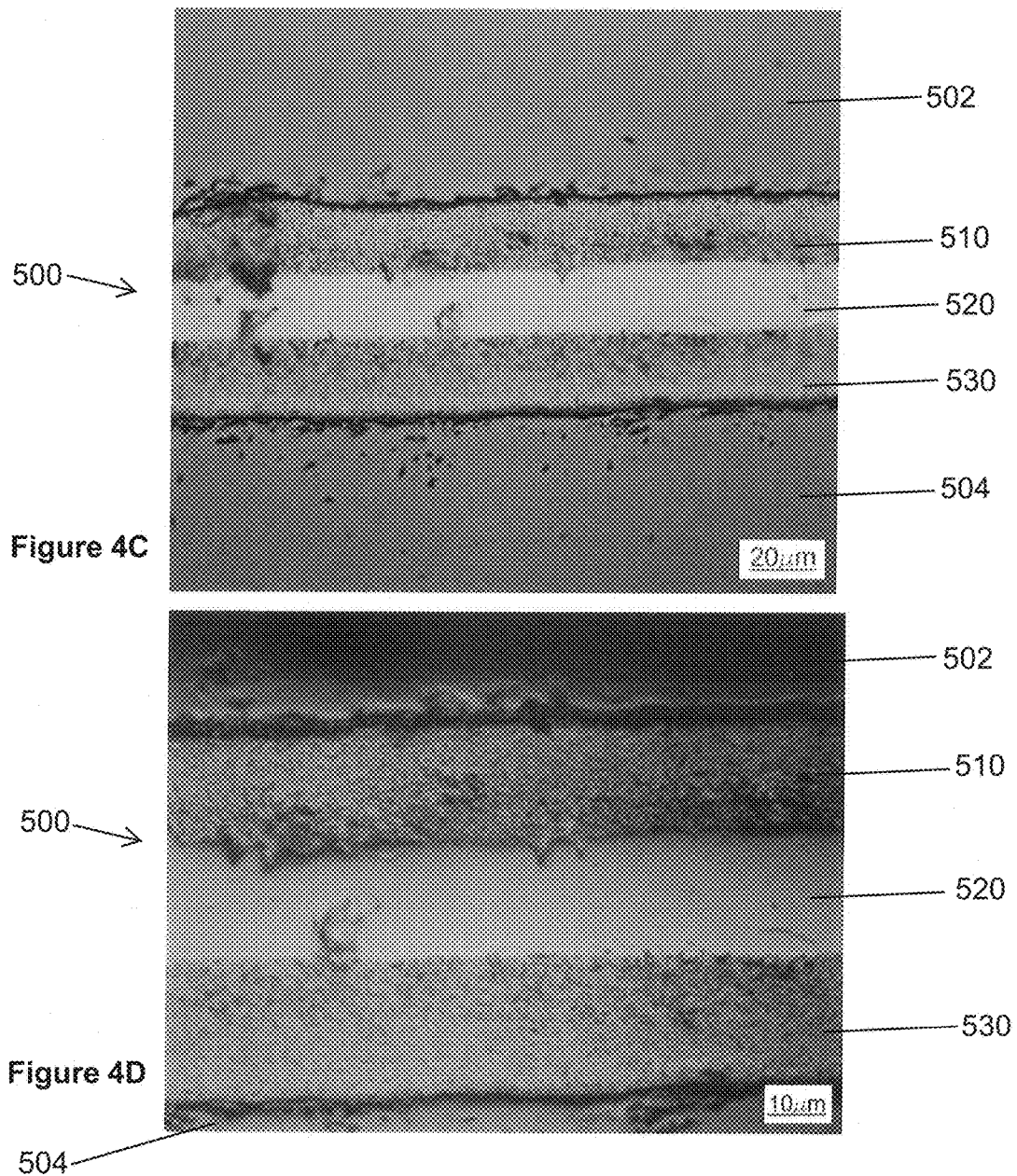

FIGS. 4A-4D illustrate exemplary SiC/iridium/SiC joints formed by vacuum diffusion bonding at 1500° C. for 8 hours with 1.3 ksi of applied pressure (as shown, for example, in Table 1). Specifically, FIGS. 4A and 4B illustrate an optical metallography of an exemplary bond region 400 from SiC/Ir/SiC sandwich bonds formed using an exemplary method under the conditions provided in Table 1 at 500× and 1000× magnification respectively. FIGS. 4C and 4D illustrate another exemplary bond region 500 from SiC/Ir/SiC sandwich bonds at 500× and 1000× magnification respectively from a second run under the same conditions as those used to generate the bond in FIGS. 4A and 4B.

These ranges are exemplary only, however, as other temperatures and pressures between 1200° C. and 1600° C., plus or minus 20° C., and 1.0 to 7.0 ksi, plus or minus 0.1 ksi, can be used without departing from the scope of the present subject matter. In the exemplary embodiment of FIGS. 4A-4D, the SiC was Morton (Rohm-Haas) material made by a chemical vapor deposition (CVD) process, which is 100% dense and 99.99% pure.

In certain of the exemplary embodiments, SiC pieces were lapped flat (1-2 μ-inch Ra) in accordance with MIL-STD-1942A and cleaned by rinsing with acetone, ultrasonically cleaning in alcohol, rinsing in de-ionized water, etching for 2-3 minutes in 50% HF acid, rinsing in acetone again, and a final rinsing with ethanol. The iridium foil was cleaned in ethanol prior to joining. In certain exemplary embodiments, SiC/Ir/SiC sandwiches were positioned in a furnace and a constant load applied on the sandwiches from the start of the bonding run. As shown in FIGS. 4A-4B, in some embodiments, the bond 400 forms with a first layer 402 of SiC, a second layer 404 of SiC, and a bonding layer disposed between the first layer 402 of SiC and the second layer 404. As shown in FIGS. 4C-4D, in some embodiments, the bond 500 forms with a first layer 502 of SiC, a second layer 504 of SiC, and a bonding layer disposed between the first layer 502 of SiC and the second layer 504. In the embodiment shown in FIGS. 4A-4B, the bonding layer includes a central layer 420 of iridium, a first reaction zone 410 positioned between the central layer 420 of iridium and the first layer 402 of SiC, and a second reaction zone 430 positioned between the central layer 420 of iridium and the second layer 404 of SiC. In the embodiment shown in FIGS. 4C-4D, the bonding layer includes a central layer 520 of iridium, a first reaction zone 510 positioned between the central layer 520 of iridium and the first layer 502 of SiC, and a second reaction zone 530 positioned between the central layer 520 of iridium and the second layer 504 of SiC. The reaction zones 410, 430 (in FIGS. 4A and 4B) and 510, 530 (in FIGS. 4C and 4D) are believed to be formed as the SiC and iridium diffuse into each other during the bonding process.

In the exemplary embodiments of FIGS. 4A-4D, each of the reaction zones 410, 430 (in FIGS. 4A and 4B) and 510, 530 (in FIGS. 4C and 4D) at the SiC/Ir interface has a grainy appearance and are each believed to be multi-phase reaction zone that includes iridium-silicides. The middle region/central layer 420 (in FIGS. 4A and 4B) and 520 (in FIGS. 4C and 4D) is unreacted iridium metal. Some pull-out is observed in the bond regions that are artifacts of metallographic preparation. Cracks are not visually observed in the bond region under this level of magnification, which indicates that these bonds could form a hermetic seal. The same bond structure was consistently produced in two different bonding runs. Notably, the bond was formed using iridium without additives.

Figure 5:
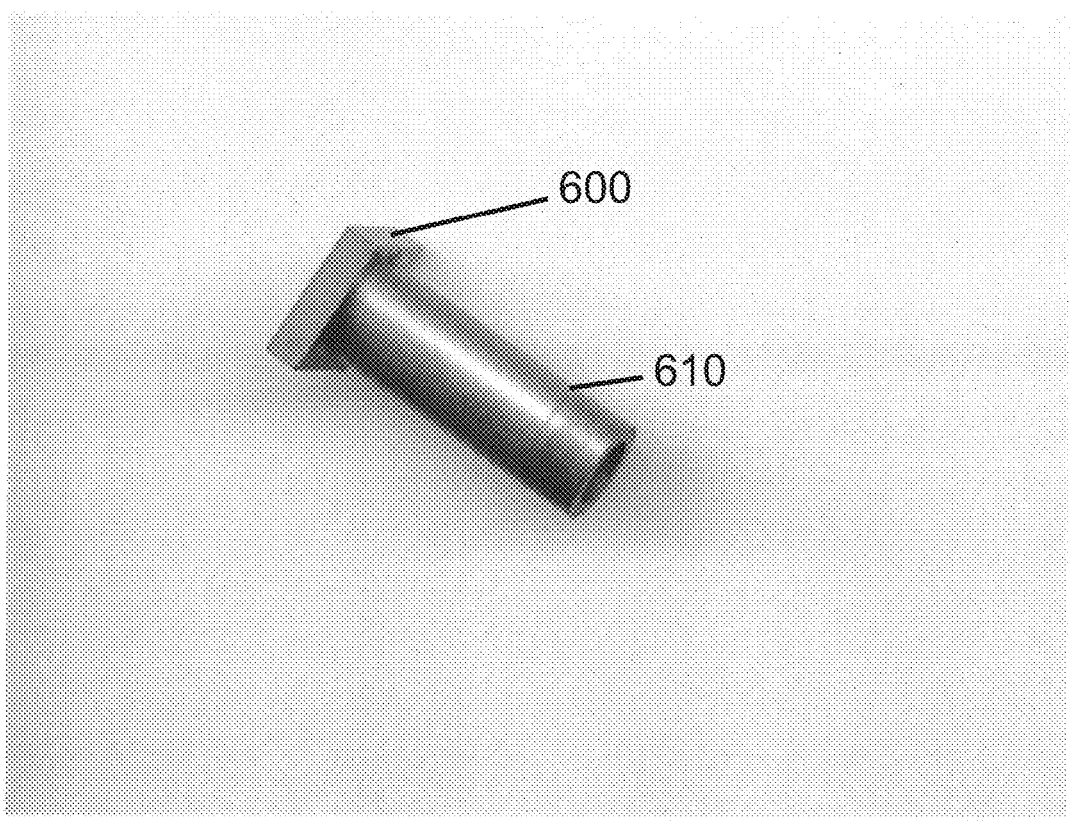
FIG. 5 is a photograph of an exemplary SiC square to SiC tube bond using iridium foil that was shown to be hermetic with a leak rate ≤3×10$^{-9}$ cm$^3$/s.

FIG. 5 shows a photograph of a square SiC cap 600 that was diffusion bonded to a SiC tube 610 using iridium foil by vacuum hot pressing (pressure <$10^{-5}$ torr) with 2.7 ksi of applied pressure at 1500° C. for eight hours, under the conditions shown in Table 2. The exemplary bond formed a hermetic seal with a leak rate <$3 \times 10^{-9}$ cm$^3$/sec using a 2-mil thick iridium foil. In other embodiments, the iridium foil may have a thickness ranging from 1 mil to 10 mil. Prior to joining, the SiC cap and tube end were lapped flat to a diamond polish (1-2 Ra) in accordance with MIL-STD-1942A and cleaned using the methods described above. Leak checking revealed that the seal between the cap and tube was hermetic, and the leak rate was <$3 \times 10^{-9}$ cm$^3$/sec.

Table 1 illustrates an exemplary summary of initial diffusion bonding parameters used to produce the SiC/Ir/SiC sandwich bonds with chemical vapor deposition (CVD SiC) as shown, for example, in FIGS. 4A-4D.

TABLE 1

| | |
|---|---|
| Test Coupon Size | Approximately 0.5" × 0.5" × 0.125" (SiC) |
| Pieces to bonded | CVD SiC (Morton or Rohm-Haas) |
| Metal Foil | Iridium (2 mils thick) |
| Processing | Vacuum Hot Pressing (pressure < $10^{-5}$ torr) |
| Temperature | 1500° C. |
| Hold Time at Temperature | 8 hours |
| Applied Pressure | 1.28 ksi |
| Atmosphere | Helium |

Table 2 illustrates a summary of exemplary diffusion bonding parameters used to produce a SiC cap on a SiC tube seal with iridium foil that was shown to be hermetic as shown, for example, in FIG. 5.

TABLE 2

| | |
|---|---|
| Tube Size | Approximately 1.0" long × 0.255" ID and 0.375" OD |
| Cap Size | approximately 0.5" × 0.5" × 0.125" |
| Pieces to bonded | CVD SiC (Morton or Rohm-Haas) |
| Metal Foil | Iridium (2 mils thick) |
| Processing | Vacuum Hot Pressing (pressure < $10^{-5}$ torr) |
| Temperature | 1500° C. |
| Hold Time at Temperature | 8 hours |
| Applied Pressure | 2.7 ksi |

TABLE 2-continued

| | |
|---|---|
| Furnace Atmosphere | Helium with less than 1 ppm each of oxygen, nitrogen, and moisture |

Table 3 illustrates an exemplary range of diffusion bonding parameters used for diffusion bonding SiC using iridium foil.

TABLE 3

| | |
|---|---|
| Parts to be joined | tubes, caps, or flats |
| Pieces to bonded | CVD SiC (Morton or Rohm-Haas) |
| Metal Foil | Iridium (1-4 mils thick) |
| Processing Atmosphere | Vacuum Hot Pressing (pressure < $10^{-5}$ torr) or Inert Atmosphere (Helium or Argon) |
| Temperature | 1200° C. to 1600° C. |
| Hold Time at Temperature | 4 to 12 hours |
| Applied Pressure | 1.0 to 7.0 ksi |
| Furnace Atmosphere | Helium or Argon with less than 1 ppm each of oxygen, nitrogen, and moisture |

Although only helium and argon are shown in the tables, other noble gases can be used without departing from the scope of the present subject matter.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims. The steps of the methods described above may be performed in any order unless the order is restricted in the discussion. Any element of any embodiment may be used in any other embodiment and/or substituted for an element of any other embodiment unless specifically restricted in the discussion.

What is claimed is:

1. A method of bonding of silicon carbide, comprising:
   inserting an iridium foil between two SiC layers;
   heating the iridium foil and SiC layers at a temperature of 1500° C. in a vacuum of <$10^{-5}$ torr;
   applying a pressure between 1 ksi and 7 ksi to the iridium foil and SiC layers;
   maintaining the temperature and pressure for 6-10 hours; and
   forming a hermetic seal having a leak rate <$3 \times 10^{-9}$ cm$^3$/sec between the iridium foil and the two SiC layers.

2. The method of claim 1, further comprising the step of forming a joint between the iridium foil and at least one of the SiC layers, wherein:
   approximately ⅓ of the joint is iridium; and
   approximately ⅔ of the joint is a reaction zone at a SiC/iridium interface.

3. The method of claim 2, wherein the reaction zone includes iridium-silicides.

4. The method of claim 1, further comprising the step of placing the iridium foil and SiC layers in an inert atmosphere.

5. The method of claim 4, wherein the inert atmosphere has less than 1 ppm each of oxygen, nitrogen, and moisture.

6. The method of claim 1, further comprising the step of cleaning the iridium foil in ethanol prior to inserting the foil between the two SiC layers.

7. The method of claim 6, further comprising:
rinsing the SiC in acetone;
ultrasonically cleaning the SiC in in alcohol;
rinsing the SiC in in de-ionized water;
etching the SiC in in HF acid;
rinsing the SiC in in acetone; and
rinsing the SiC with ethanol.

8. The method of claim 7, further comprising the step of placing the iridium foil and SiC layers in an inert atmosphere.

9. The method of claim 8, wherein the inert atmosphere has less than 1 ppm each of oxygen, nitrogen, and moisture.

10. The method claim 1, wherein at least one of the SiC layers is flat to within flat 2 µ-inches Ra.

11. The method claim 10, wherein the at least one SiC layer is approximately 100% dense and 99.99% pure.

12. The method of claim 1, wherein the iridium foil is approximately 2 mils thick.

13. The method of claim 1, wherein one of the two SiC layers is tubular.

* * * * *